Patented Dec. 1, 1953

2,661,308

UNITED STATES PATENT OFFICE 2,661,308

PROCESS OF COATING PAPER AND PRODUCT RESULTING THEREFROM

Julian L. Azorlosa, Wilmington, Del., assignor to Hercules Powder Company, Wilmington, Del., a corporation of Delaware No Drawing. Application November 18, 1948, Serial No. 60,822

11 Claims. (Cl. 117—62)

1

This invention relates to a coated paper and to a composition of matter and process useful therefor.

In the preparation of a coated paper, it is conventional to prepare a mixture of water and a pigment such as clay or the like, optionally together with other materials such as, for example, a soluble pyrophosphate which may act as a dispersing and stabilizing agent. This mixture, otherwise known as a pigment slip or, since it generally contains clay, as a clay slip, is then compounded with a binder or adhesive material to produce a composition known in the art as a coating color which is useful for coating a cellulose web. Considerable quantities of the binder are used, and, accordingly, the composition and characteristics of the binder are of great importance in determining the qualities of the finished paper. Important properties of the binder are that they must impart to the coating color or to the finished paper a high degree of brightness, smoothness and gloss, and a good finish and feel after calendering. In addition to these basic qualities required in coatings, there are various further characteristics that go far toward determining the value and utility of coating adhesives: (1) the coating color must flow smoothly and evenly so that it may be applied to paper at sufficiently high speeds to be economical in ordinary coating processes; (2) the coating must have high strength, to permit subsequent printing on the coated paper without "picking;" and (3) the coating must have a high wet-rub resistance for uses wherein the coated paper is treated with water, as for example, in off-set printing. It has previously been difficult to find a satisfactory adhesive or binder which is favorably adapted for these critical needs and which, at the same time, is economically available.

Now in accordance with the present invention, there is utilized as a coating adhesive a composition of matter comprising a vinyl copolymer having as one vinyl component a compound having in its molecular configuration a masked carboxy group, regenerable by hydrolysis, the carboxylic component being present in an amount to provide in the copolymer about one carboxy group to between 2 and 30 total molecular parts of the component monomers. The carboxylic component may be incorporated as an ester, amide, or other functional group and thereafter converted to the free carboxy group by hydrolysis of the copolymer. The thus prepared copolymer is mixed in aqueous dispersion with a pigment and, optionally, other ingredients to form a coat-

2 ing color which then is coated on a paper surface to provide a coated paper of excellent quality, and, according to a preferred embodiment of the invention, the coated paper is subsequently treated, for example, in an alum solution to render the coating insoluble and, thus, to produce exceptionally high wet-rub resistance.

The general nature of the invention having been set forth hereinbefore, the following examples are now presented in illustration, but not in limitation thereof.

EXAMPLE 1

Twenty-five and eight-tenths parts by weight of methyl acrylate, 129 parts by weight of vinyl acetate, and 1.24 parts by weight of benzoyl peroxide were dissolved in 177 parts by volume of benzene and heated in a nitrogen atmosphere at 50° C. for ten days. The resulting product was a solution containing a copolymer of methyl acrylate and vinyl acetate which was characterized by being about 96% converted to the copolymer. To the thick benzene solution was added 1000 parts by volume of methanol and the benzene was then removed by distillation as the methanol-benzene azeotrope. The total volume of the solution was then brought to 1500 parts by the addition of further methanol and the solution was heated to reflux temperature. Fifty parts by volume of concentrated hydrochloric acid was added and the mixture was held at reflux temperature for 18 hours during which time a powderlike precipitate separated. The powder was filtered, washed with hot methanol, and dried in vacuo at 70° C. at 15 mm. pressure for 16 hours.

Forty parts of the thus prepared product was dissolved in 587 parts of 0.29 normal sodium hydroxide. The solution was heated to 90–95° C. 18 hours during which time the pH dropped to about 11. The pH was then adjusted to 10.2 by means of concentrated hydrochloric acid to yield an aqueous solution of a coating adhesive comprising a hydrolyzed methyl acrylate-vinyl acetate copolymer. The proportions of the ingredients in the thus prepared binder were equivalent to a copolymer prepared from one molecular part of methyl acrylate to five molecular parts vinyl acetate.

EXAMPLE 2

A clay slip was prepared by mixing 1000 parts of clay with a 0.5% solution of sodium pyrophosphate to yield a product containing 70% solids. The pH of this clay slip was adjusted to 7.9 through the use of four parts of 10% sodium hydroxide, and the thus prepared clay slip was mixed with the copolymer solution prepared according to Example 1 in proportions to yield a coating color containing 6% of the adhesive binder based on the weight of the clay and the volume adjusted by addition of water to yield a 44.8% solids composition. The mixture was stirred vigorously to give a smooth coating color and after eight minutes of stirring was passed through a 60-mesh screen to insure the absence of undispersed clay agglomerates.

The thus prepared coating color was coated on several sheets of bleached sulfite waterleaf using a standard papercoating machine. One sheet, for convenience called paper No. 1, was dried in air at room temperature, another sheet (No. 2) was dried for eight minutes at 110° C. and a third sheet (No. 3) was dipped (coated side only) into a 1% papermaker's alum solution and dried at room temperature. All of the sheets were then conditioned for two days at 23–24° C. and 50% relative humidity to yield in each case a coated paper having satisfactory properties.

EXAMPLE 3

The process of Example 2 was repeated using a coating color composition containing 9% of the binder based on the amount of clay and the thus prepared coating color was utilized to prepare test sheets (numbered, respectively, 4, 5, and 6) in the same manner as described in Example 2, the sheets being (4) air dried, (5) oven dried, and (6) alumed.

EXAMPLE 4

Twelve and nine-tenths parts by weight of methyl acrylate, 129 parts by weight of vinyl acetate, and 1.14 parts by weight of benzoyl peroxide were dissolved in 162 parts by volume of benzene. The copolymerization procedure of Example 1 was repeated with this benzene solution of methyl acrylate and vinyl acetate and the product was then hydrolyzed as described in Example 1, using 145 parts of 0.53 normal sodium hydroxide. The thus formed adhesive binder had a composition equivalent to that of a copolymer prepared from one molecular part of methyl acrylate to 10 molecular parts of vinyl acetate. The hydrolyzed copolymer was dissolved in water and was utilized for the preparation of clay-coating colors containing 6 and 9% binder based on the weight of the clay and for the coating of paper therewith according to the procedures of Examples 2 and 3. The paper products (numbered, respectively, 7, 8, 9, 10, 11, and 12) were tested as described hereinafter.

EXAMPLE 5

The process of Example 4 was repeated utilizing 8.6 parts of methyl acrylate, 129 parts vinyl acetate, and 1.10 parts of benzoyl peroxide in 157 parts of benzene. The hydrolyzed copolymer prepared through the use of these ingredients had a composition equivalent to that of a copolymer prepared from one molecular part methyl acrylate to 15 molecular parts of vinyl acetate, and was utilized to prepare clay-coating colors and coated paper according to the procedure of Examples 2 and 3, test sheets (Nos. 13 to 18, respectively) being prepared.

A rough but adequate test of the wet-rub resistance of the coated paper was utilized to test the papers prepared according to Examples 2 to 8. According to this test, the operator moistened a suitable surface with water and rubbed this surface across the coated side of the paper, and then placed the test surface against a piece of black paper. The amount of coating color which was rubbed off the paper onto the test surface and subsequently transferred to the black paper was a qualitative indication of the wet-rub resistance of the paper and indicated adequately whether the wet-rub resistance of the paper was nil, poor, fair, good, or excellent.

The papers as prepared according to Examples 2 to 8 were likewise tested by the standard Dennison wax test to provide a numerical indication of the effectiveness of the coating color, particularly with respect to its printing qualities.

Table I presents the results of these tests on the air-dried sheets, oven-dried sheets, and alum-dipped sheets prepared according to each of the examples, as compared with a similar paper containing about 20% starch as a binder.

*Table I*

| Example | Paper No. | Percent Binder Based on Clay | Color Solids | Operational Detail | Dennison Wax Test | Wet Rub |
|---|---|---|---|---|---|---|
| 2 | 1 | 6.0 | 44.8 | Air Dried | <2 | Poor. |
| 2 | 2 | 6.0 | 44.8 | Oven Dried | <2 | Do. |
| 2 | 3 | 6.0 | 44.8 | Alumed Sheets | <2 | Do. |
| 3 | 4 | 9.0 | 38.4 | Air Dried | 5 | Poor. |
| 3 | 5 | 9.0 | 38.4 | Oven Dried | 5 | Fair. |
| 3 | 6 | 9.0 | 38.4 | Alumed Sheets | 6 | Excellent. |
| 4 | 7 | 6.0 | 46.8 | Air Dried | 3+ | Poor. |
| 4 | 8 | 6.0 | 46.8 | Oven Dried | 3+ | Fair. |
| 4 | 9 | 6.0 | 46.8 | Alumed Sheets | 3+ | Good. |
| 4 | 10 | 9.0 | 40.7 | Air Dried | 6 | Fair. |
| 4 | 11 | 9.0 | 40.7 | Oven Dried | 6 | Do. |
| 4 | 12 | 9.0 | 40.7 | Alumed Sheets | 7− | Excellent. |
| 5 | 13 | 6.0 | 45.9 | Air Dried | 3+ | Fair. |
| 5 | 14 | 6.0 | 45.9 | Oven Dried | 3+ | Do. |
| 5 | 15 | 6.0 | 45.9 | Alumed Sheets | 3 | Good. |
| 5 | 16 | 9.0 | 39.9 | Air Dried | 6− | Fair +. |
| 5 | 17 | 9.0 | 39.9 | Oven Dried | 6 | Do. |
| 5 | 18 | 9.0 | 39.9 | Alumed Sheets | 6− | Excellent. |
| Control | | 18 Starch | 42.0 | Air Dried | <2 | Poor. |
| Do | | do | 42.0 | Oven Dried | <2 | Do. |
| Do | | do | 42.0 | Alumed Sheets | <2 | Do. |

The new coating color composition according to this invention comprises an aqueous mixture of a pigment or a clay slip with a binding material such as is described in the examples, the binding material being a vinyl copolymer having in its molecular structure a significant number of regenerated carboxy groups. The suitable composition range for the copolymer corresponds to molecular ratios of the constituent ingredients so selected that for each carboxy group in the copolymer there are from about 2 to about 30 total molecular parts of the constituent monomers. Within this range of constituents, the copolymer contains a sufficient number of carboxy groups to permit the coating color to be insolubilized by treatment with an agent such as, for example, alum or the like, and, at the same time, contains a sufficiently small number of these groups so that the resulting product is a somewhat flexible coating composition.

For optimum results in the coating of paper, it is preferred to prepare a coating color having a total solids composition which is relatively high, thus providing good surface coating qualities and economical operation. A preferred range of total solids for the coating color is between about 30 and 70% solids with an optimum value at about 50–65%. The amount of the binder in the coating color is maintained between about 5 and about 15% based on the weight of clay and preferably between about 6 and about 10%. A composition containing an amount of total solids and binder in this range is characterized by being readily applied to the surface of the paper and by forming a highly resistant coating thereon. Thus, utilizing the coating color according to this invention, there is produced a clay-coated paper which is highly satisfactory for use in printing operations and is resistant to disturbance of the clay-coating surface through rubbing, picking, and the like.

In the preferred embodiment of this invention, the paper which has been coated by means of the coating color described herein is subjected to a further treatment causing the binder to become insolubilized, and, accordingly, to become more resistant to the effects of water. Thus, the binding composition containing a copolymer having a substantial quantity of regenerated carboxyl groups in its structure is treated with an insolubilizing agent such as a solution containing significant quantities of metallic ions. Among the insolubilizing agents which have been found satisfactory are materials containing aluminum ions such as aluminum sulfate and the like, ferrous and ferric ions, calcium, magnesium and chromium salts, and the like.

In place of the hydrolyzed methyl acrylate-vinyl acetate copolymer utilized as binder according to the present invention, there may be used substantial equivalents for the thus defined copolymer. For example, hydrolysis products of methyl methacrylate-vinyl acetate copolymers, methyl acrylate-2-propenyl acetate copolymers, hydrolyzed ethyl acrylate copolymers, hydrolyzed acrylamide- or acrylonitrile-containing copolymers and the corresponding methacrylic copolymers, and the like, may be utilized to provide a composition characterized by having a sufficient number of carboxy groups to provide insolubilizing upon the subsequent treatment with an insolubilizing agent while maintaining the other desirable qualities and characteristics of the composition. Thus, there may be used copolymers of masked acrylic acids and of other masked vinyl acids including various esters, amides, nitriles and other functional derivatives of methacrylic acid, α-ethyl acrylic acid, crotonic acid, vinyl acetic acid or the like. These acids may be used in copolymers with other vinyl compounds such as, for example, vinyl alcohols, and the like, as well as with unsubstituted vinyl hydrocarbons.

By the same token, instead of clay itself, there may be utilized other paper filling compositions and materials such as, for example, calcium sulfate, titanium dioxide, satin white or other coating pigments alone, or preferably with a clay base. The modification of the coating color using these materials will be within the knowledge of those skilled in the art.

The utility of applicant's invention is not limited to the particular type of paper pulp used, and, accordingly, applicant's invention may be utilized with the various types of kraft, soda, sulfite pulp, and the like as well as with the various chemical and semichemical paper pulps. By the same token, the invention may be utilized with various types of paper products such as paper, fiber board, and the like. In all instances, the product produced by applicant's invention is characterized by being relatively resistant to abrasion and by having a surface of improved printing properties and the like.

What I claim and desire to protect by Letters Patent is:

1. The method of producing coated paper of type having a base and a printing surface consisting of a continuous film of pigment interspersed in binder by means of which the filler is retained on the base which comprises completely covering a face of a paper web with an continuous viscous coating consisting essentially of a pigment dispersed in an aqueous solution of a binder consisting essentially of a hydrolyzed copolymer of vinyl compounds and then drying the coated paper web, said hydrolyzed copolymer containing carboxyl groups in an amount equivalent to a molar ratio of total vinyl compound to carboxyl-containing vinyl compound of from 2 to 30, said copolymer prior to hydrolysis being a copolymer of a compound selected from the group consisting of vinyl acetate and 2-propenyl acetate with a vinyl compound hydrolyzable to a vinyl carboxylic acid and having the formula

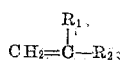

where $R_1$ is selected from the group consisting of hydrogen, methyl and ethyl and where $R_2$ is selected from the group consisting of amide, nitrile, carbomethoxy and carbethoxy.

2. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a hydrolyzed copolymer of vinyl compounds and then drying the coated paper web, and hydrolyzed copolymer containing carboxyl groups in an amount equivalent to a molar ratio of total vinyl compound to carboxyl-containing vinyl compound of from 2 to 30, said copolymer prior to hydrolysis being a copolymer of vinyl acetate with a vinyl compound hydrolyzable to a vinyl carboxylic acid and having the formula

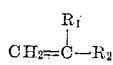

where $R_1$ is selected from the group consisting of hydrogen, methyl and ethyl and where $R_2$ is selected from the group consisting of amide, nitrile, carbomethoxy and carbethoxy.

3. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a hydrolyzed copolymer of vinyl acetate and methyl acrylate and then drying the coated paper web, said hydrolyzed copolymer containing carboxyl groups in an amount equivalent to a molar ratio of total vinyl compound to acrylic acid of from 2 to 30.

4. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a hydrolyzed copolymer of vinyl acetate and methyl acrylate, and then drying the coated paper web, said hydrolyzed copolymer containing carboxyl groups in an amount equivalent to a molar ratio of total vinyl compound to acrylic acid of from 5 to 15.

5. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a hydrolyzed copolymer of vinyl compounds, treating the coated paper web with an aqueous solution of an insolubilizing agent for the binder, and then drying the coated paper web, said hydrolyzed copolymer containing carboxyl groups in an amount equivalent to a molar ratio of total vinyl compound to carboxyl-containing vinyl compound of from 2 to 30, said copolymer prior to hydrolysis being a copolymer of a compound selected from the group consisting of vinyl acetate and 2-propenyl acetate with a vinyl compound hydrolyzable to a vinyl carboxylic acid and having the formula

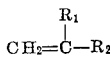

where R₁ is selected from the group consisting of hydrogen, methyl and ethyl and where R₂ is selected from the group consisting of amide, nitrile, carbomethoxy and carbethoxy.

6. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a hydrolyzed copolymer of vinyl acetate and methyl acrylate, treating the coated paper web with an aqueous solution of alum to insolubilize the binder, and then drying the coated paper web, said hydrolyzed copolymer containing carboxyl groups in an amount equivalent to a molar ratio of total vinyl compound to acrylic acid of from 5 to 15.

7. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a water-soluble hydrolyzed copolymer of vinyl compounds, said hydroyzed copolymer containing carboxyl groups in an amount equivalent to a molar ratio of total vinyl compound to carboxyl-containing vinyl compound of from 2 to 30, said copolymer prior to hydrolysis being a copolymer of a compound selected from the group consisting of vinyl acetate and 2-propenyl acetate with a vinyl compound hydrolyzable to a vinyl carboxylic acid and having the formula

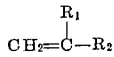

where R₁ is selected from the group consisting of hydrogen, methyl and ethyl and where R₂ is selected from the group consisting of amide, nitrile, carbomethoxy and carbethoxy.

8. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a water-soluble hydrolyzed copolymer of vinyl compounds, said hydrolyzed copolymer containing carboxyl groups in an amount equivalent to a molar ratio of total vinyl compound to carboxyl-containing vinyl compound of from 2 to 30, said copolymer prior to hydrolysis being a copolymer of vinyl acetate with a vinyl compound hydrolyzable to a vinyl carboxylic acid and having the formula

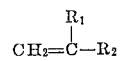

where R₁ is selected from the group consisting of hydrogen, methyl and ethyl and where R₂ is selected from the group consisting of amide, nitrile, carbomethoxy and carbethoxy.

9. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a water-soluble hydrolyzed copolymer of vinyl compounds, said hydrolyzed copolymer containing carboxyl groups in an amount equivalent to a molar ratio of total vinyl compound to carboxyl-containing vinyl compound of from 5 to 15, said copolymer prior to hydrolysis being a copolymer of vinyl acetate, with a vinyl compound hydrolyzable to a vinyl carboxylic acid and having the formula

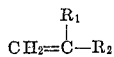

where R₁ is selected from the group consisting of hydrogen, methyl and ethyl and where R₂ is selected from the group consisting of amide, nitrile, carbomethoxy and carbethoxy.

10. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a water-soluble hydrolyzed copolymer of vinyl acetate and methyl acrylate, said hydrolyzed copolymer containnig carboxyl groups in an amount equivalent to a molar ratio of total vinyl compound to acrylic acid of from 2 to 30.

11. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a water-soluble hydrolyzed copolymer of vinyl acetate and methyl acrylate, said hydrolyzed copolymer containing carboxyl groups in an amount equivalent to a molar ratio of total vinyl compound to acrylic acid of from 5 to 15.

JULIAN L. AZORLOSA.

References Cited in the file of this patent

UNITED STATES PATENTS

| Number | Name | Date |
|---|---|---|
| 1,976,679 | Fikentscher | Oct. 9, 1934 |
| 2,067,706 | Fikentscher | Jan. 12, 1937 |
| 2,251,296 | Shipp | Aug. 5, 1941 |
| 2,287,161 | Ball | June 23, 1942 |
| 2,343,095 | Smith | Feb. 23, 1944 |
| 2,419,880 | Blyler | Apr. 29, 1947 |
| 2,476,527 | Barnes | July 19, 1949 |

FOREIGN PATENTS

| Number | Country | Date |
|---|---|---|
| 578,767 | Great Britain | July 11, 1946 |